United States Patent [19]

Da Costa

[11] Patent Number: 5,062,779
[45] Date of Patent: Nov. 5, 1991

[54] OUTLET VALVE FOR A ROLLING PISTON ROTARY COMPRESSOR

[75] Inventor: Caio M. F. N. Da Costa, Joinville, Brazil

[73] Assignee: Empressa Brasileira De Compressores S.A.-Embraco, Joinville, Brazil

[21] Appl. No.: 486,980

[22] Filed: Feb. 27, 1990

[30] Foreign Application Priority Data

Mar. 9, 1989 [BR] Brazil .............................. PI 8901183

[51] Int. Cl.⁵ .................... F04C 18/344; F16K 15/16
[52] U.S. Cl. .................................. 418/270; 418/270; 137/855; 137/856
[58] Field of Search ................... 418/270, 63; 137/855, 137/856, 857, 858

[56] References Cited

U.S. PATENT DOCUMENTS

| | | | |
|---|---|---|---|
| 73,038 | 1/1868 | Pollard | 137/858 |
| 338,609 | 3/1886 | Nysewander | 137/858 |
| 3,003,684 | 10/1961 | Tarleton | 418/63 |
| 3,805,828 | 4/1974 | Panagrossi | 137/858 |
| 4,580,604 | 4/1986 | Kawaguchi et al. | 418/270 |
| 4,611,665 | 9/1986 | Byrne | 137/855 |
| 4,714,416 | 12/1987 | Sano | 418/63 |

Primary Examiner—Richard A. Bertsch
Assistant Examiner—David L. Cavanaugh
Attorney, Agent, or Firm—Darby & Darby

[57] ABSTRACT

An outlet valve for rotary rolling piston compressor, the piston being assembled within a cylinder block having an attached end wall provided with gas discharge passage whose outlet end defines an annular valve seat placed in an oblong recess area circumscribing the valve seat within which a valve blade is located, the area between the bottom wall with the circumscribing side wall of the oblong recess and/or with the peripheral wall of the valve seat being curved to reduce the turbulence of gas leaving the outlet of the discharge passage.

9 Claims, 4 Drawing Sheets

OUTLET VALVE FOR A ROLLING PISTON ROTARY COMPRESSOR

BACKGROUND OF THE INVENTION

This invention relates to an outlet valve for a rotary rolling piston compressor and more specifically to a new construction for housing the outlet valve to be used in compressor of such type which is usually employed in small refrigerating equipments.

Rotary rolling piston compressors usually have direct suction and outlet communicating with the inside of the case, that is, they operate with a high pressure within the case (high-side compressors). In said type of compressor, the high pressure gas contained inside the case becomes an excellent means to carry noise. Pulses and turbulence from the discharge of compressed gas within the compressor assembly into the interior of the case are transmitted through high pressure gaseous means to the case walls which vibrate, therefore producing noise.

From the above-mentioned description, it is known that it is important to avoid or reduce the generation of turbulence in the outlet flow of a "high-side" type compressor. A favorable place for turbulence formation is at the discharge hole outlet of the compression chamber where the high speed discharge gas flow collides with the recess walls which house the valve at the outer face of the respective end wall of the compressor assembly cylinder. The formation of turbulence is also due to the boundary layer separation at the valve seat outlet (as hereinafter illustrated). The turbulence cased at such area circumscribing the outlet valve seat mainly produces high frequency noises.

Previously, no concern was given to such noise generating mechanisms by turbulence at the discharge port outlet of rotary compressors. Most of such compressors have a discharge valve housing recess machined generally at right angles on the outer face of the end cylinder wall. This wall is usually defined by one of the bearings of the compressor crankshaft, such as it is shown in FIGS. 1, 2 and 3. That construction of the prior art compression is very favorable to turbulence formation in the discharge flow right at the discharge port outlet.

OBJECTS OF THE INVENTION

An object of this invention is to provide a housing recess for the respective discharge valve seat on one of the end walls of the compressor assembly cylinder, which eliminates the turbulence formation problem causing high frequency noises in the gas flow at the discharge port outlet.

A further object hereof is to provide a discharge valve housing recess of the above-mentioned type, which recess is easily manufactured by a simple machining or sinterizing of the part defining the cylinder end wall which has said recess.

BRIEF DESCRIPTION OF THE INVENTION

The outlet valve of the invention is applied to a rotary compressor wherein the rolling piston is assembled within the cylinder defined by a cylinder block and two opposed end walls. One of the end walls is provided with a cylinder gas discharge port, the outlet end of which defines an annular valve seat placed in an oblong recess made in said end wall and inside of which a blade outlet valve is assembled. According to this invention, the area of the oblong recess circumscribing the valve seat has its bottom wall mating, through said curved surfaces, with the lateral circumscribing wall of the oblong recess and/or with the peripheral wall of the valve seat.

The area joining the recess bottom and the peripheral edge of the valve seat and/or the side wall of the recess circumscribing the valve seat is rounded so that the gas discharge flow becomes smoother, thereby avoiding turbulence formation right after the valve outlet and, therefore, high frequency noise formation.

The gas flow smoothness can further be increased since the bottom wall of the recess circumscribing area can have a concave shape mating at least with one of the parts defined by the side circumscribing wall of the oblong recess and by the valve seat peripheral edge.

In one embodiment of the invention, the circumscribing side wall of the oblong recess keeps a radial spacing to the peripheral edge of the valve seat not less than about ¾ of the diameter of said peripheral edge of the valve seat, such spacing being enough to cause the gas flow from the discharge port to reach the circumscribing side wall of the oblong recess at a substantially reduced speed.

The circumscribing side wall of the oblong recess can further have, in relation to the peripheral edge of the valve seat, its contour substantially increasing in an elliptical shape from the points of said circumscribing side wall which are placed nearly on the extensions of the diameter of the valve seat transversely of the longitudinal shaft of the valve blade towards the point of said side wall which is placed on the extension of the blade longitudinal shaft. Such reduction in the curvature of the circumscribing side wall at the area corresponding to the opening side of the valve blade, besides smoothing the gas flow, substantially reduces the loss of load in the gas flow being discharged into the cylinder.

BRIEF DESCRIPTION OF THE DRAWINGS

The invention will hereinafter be described with reference to the annexed drawings, in which.

DETAILED DESCRIPTION OF THE INVENTION

Figure 1:
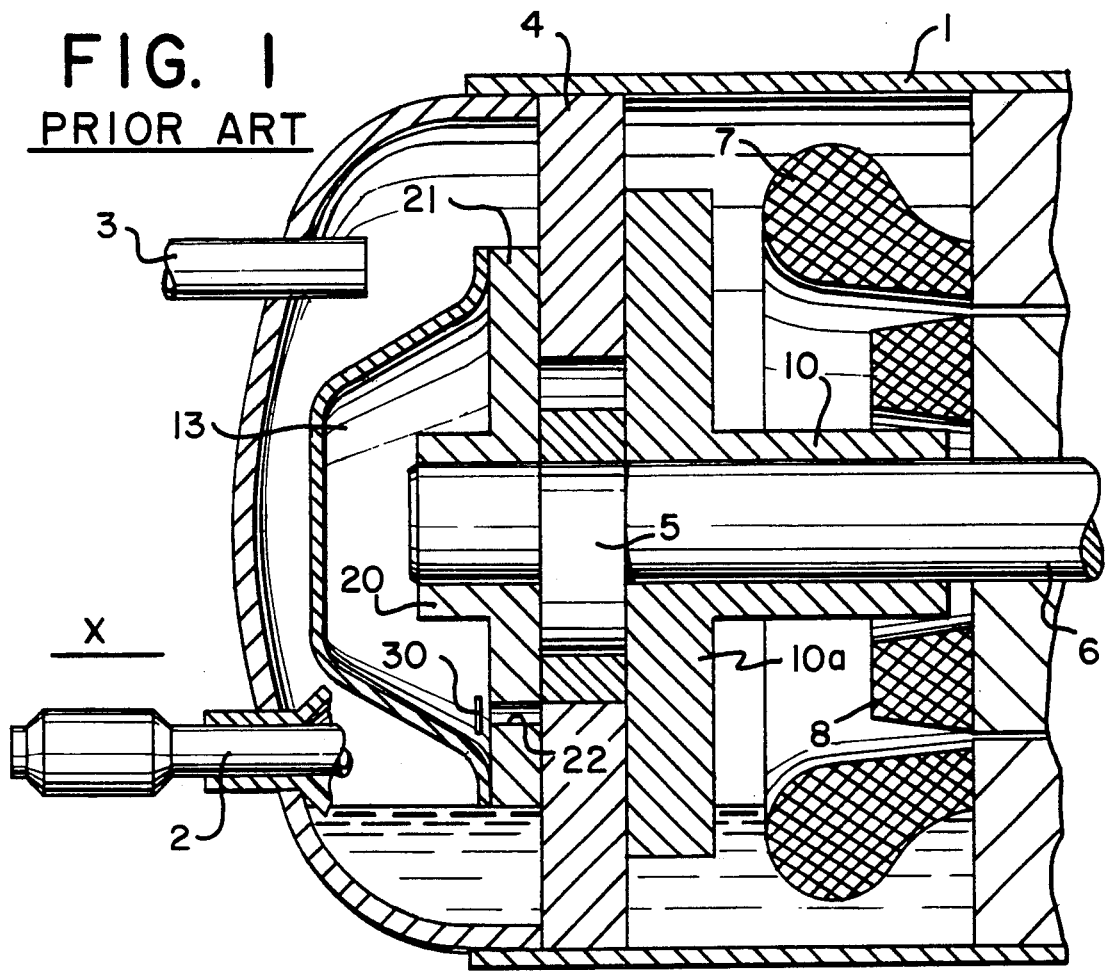
FIG. 1 shows a partial longitudinal section view of a rotary rolling piston compressor of the type used in this invention.
Figure 2:
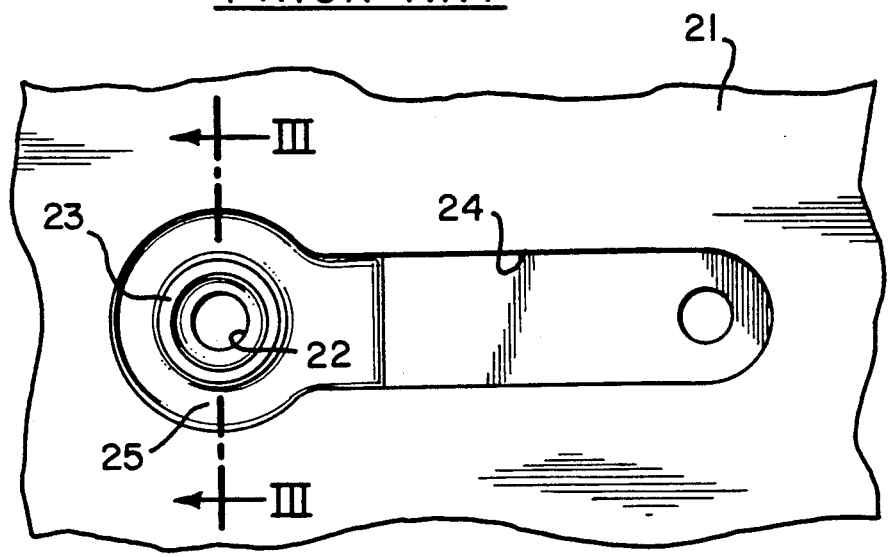
FIG. 2 shows a partial plan view of the end wall of the cylinder, which is represented by the secondary bearing taken towards the arrow X of FIG. 1, illustrating the oblong recess shape for housing the outlet valve of the prior art.

According to FIG. 1, the compressor has a case 1 with an attached suction tube and its coupling 2 and a discharge tube 3. The case also houses a cylinder block 4 within which a rotary rolling piston 5 is placed, the latter being an eccentric on a crankshaft 6 which is driven by an electric motor made up of stator 7 and rotor 8. The crankshaft 6 is supported by a main bearing 10 and by a secondary bearing 20, each of which has a plate or flange 10a and 21 which is attached to one of the end axial faces of the cylinder block 4. The plates 10a and 21 define the cylinder walls within which the rolling piston 5 rotates. The piston also defines with the cylinder and its end walls in a well known manner a compression chamber and a suction chamber.

In the example shown, a discharge damping chamber 13 is provided at the outer face of the secondary bearing 20 to receive compressed gas from the cylinder. The plate 21 of the secondary bearing 20 is provided with an axial discharge passage 22. The passage outlet end defines an annular valve seat 23 within an oblong recess 24 formed on the outer face of the plate 21 on the secondary bearing 20. Recess 24 is sized to house a blade shaped valve 30, the opening position of which is limited by a backstop 31 which is attached to the recess bottom 24 by a rivet 32.

It should be understood that the recess 24, the outlet valve 30 and the discharge passage 22 need not necessarily be associated with the secondary bearing 20. They can be provided together with any member defining one of the end walls of the compressor cylinder assembly.

Figure 3:
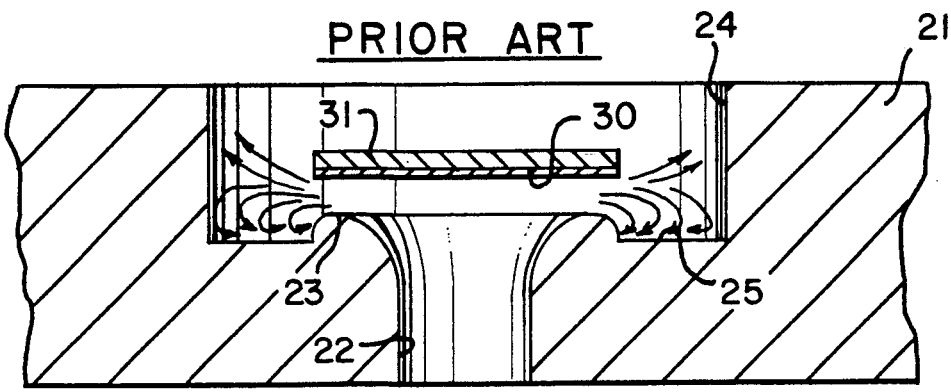
FIG. 3 shows an enlarged cross section view taken along line III—III of FIG. 2 and showing the valve blade and the backstop thereof.
Figure 4:
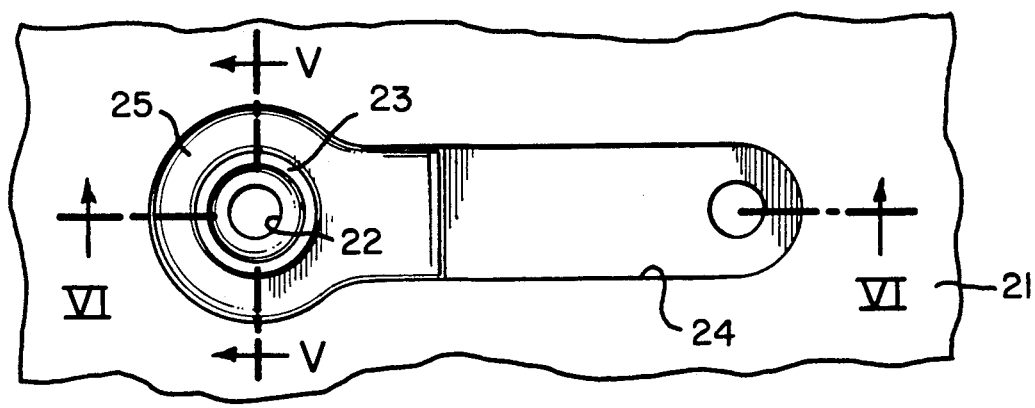
FIG. 4 shows a plan view similar to that of FIG. 2, but showing the oblong recess contour which is made according to this invention.
Figure 5:
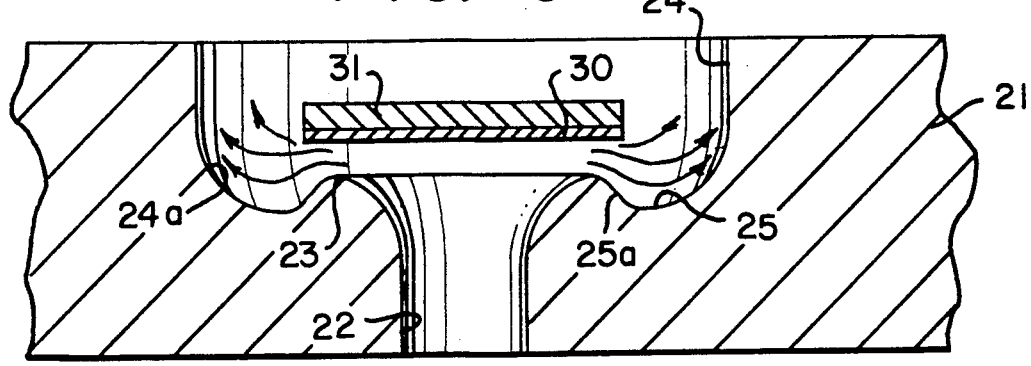
FIG. 5 shows an enlarged cross section view taken along line V—V of FIG. 4 and further showing its relative position of the blade and backstop.
Figure 6:
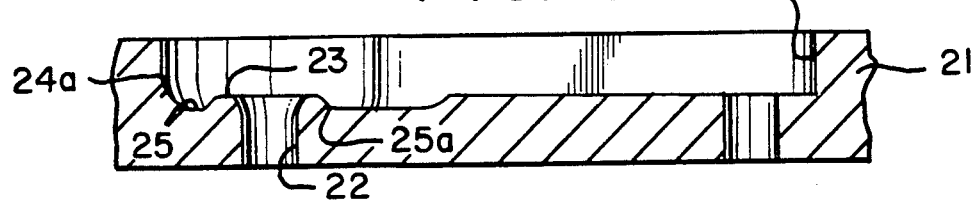
FIG. 6 shows a longitudinal cross-section view taken along line VI—VI of FIG. 4.
Figure 7:
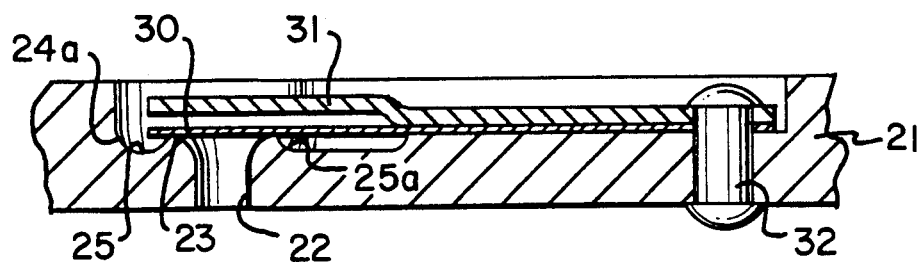
FIG. 7 is a longitudinal section view similar to that of FIG. 6, but showing the relative position of the blade and backstop.

FIG. 3 shows an oblong recess 24 made according to the present art that has the area of the bottom wall 25 which circumscribes the valve seat 23 forming sharp corners and being substantially orthogonal to the side adJacent wall of the recess 24 and to the peripheral wall of the valve seat.

In FIGS. 4, 5, 6 and 7 a first embodiment of this invention is shown wherein the area of the bottom wall 25 which circumscribes the valve seat 23 mates with the side circumscribing wall of the recess 24 through a curved surface 24a like a rounded fillet in a concave contour shape.

According to this first embodiment, the sharp corners between the bottom wall 25 and the side circumscribing wall of the recess 24 are eliminated. This configuration allows the gas discharge flow condition to be substantially modified. The condition of the gas discharge flow is further improved by a curved surface 25a, like a rounded fillet at the joining area between the bottom wall 25 and the peripheral wall of the valve seat 23.

Figure 8:
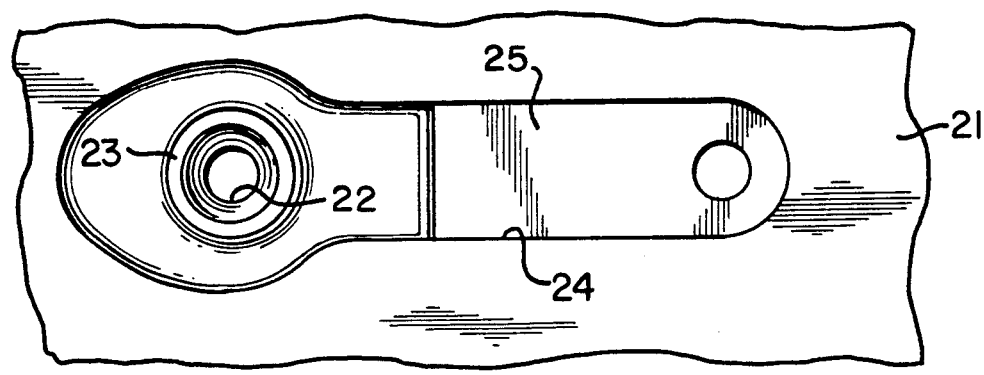
FIGS. 8 and 9 show respectively a plan view and a longitudinal section view of a second embodiment for the oblong recess for housing the outlet valve.
Figure 9:
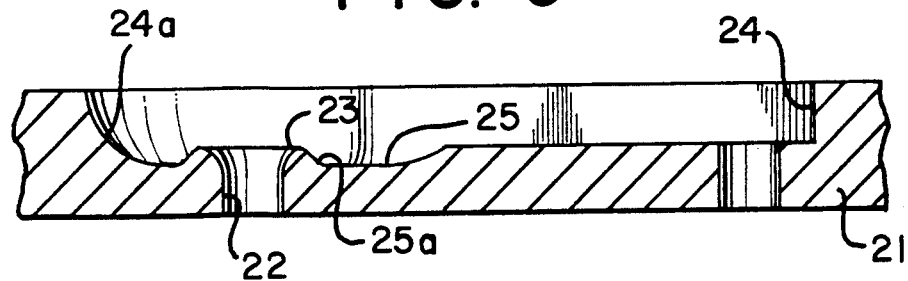

In the embodiment illustrated in FIGS. 8 and 9 a further modification is introduced in addition to that provided for in the configuration of FIGS. 4, 5, 6 and 7. This modification is concerned with the radial spacing between the peripheral edge of the valve seat 23 and the circumscribing side wall of the recess 24. In the embodiments of FIGS. 4, 5, 6, 7, 10 and 11 said radial spacing is at least nearly constant and not smaller than nearly ¾ diameter of the peripheral edge of the valve seat 23.

In the embodiment of FIGS. 8 and 9, the radial spacing increases from the valve seat side towards the area of the side wall of the recess 24 which is provided along the longitudinal alignment of the valve blade 30. In a more specific way, the radial spacing increases from the points of the side wall of the recess which are located on both opposed sides of the valve seat in relation to the blade longitudinal shaft 30, towards the point of the side wall which faces the blade opening side. With such a constructive arrangement, that side of valve has a configuration much more adequate to the gas flow, therefore avoiding not only the turbulence formation but also minimizing the load losses.

Figure 10:
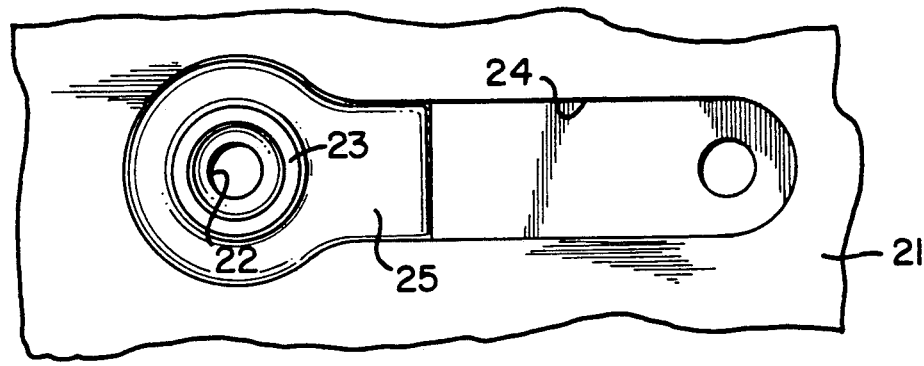
FIGS. 10 and 11 show, respectively, a plan view and a longitudinal section view of a third embodiment for the oblong recess for housing the outlet valve.
Figure 11:
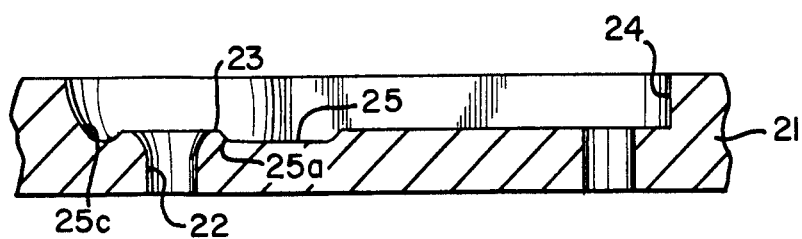

Said variable spacing characteristic can be used together with one or both fillets 24a and 25a and also with the characteristic illustrated in FIGS. 10 and 11, wherein the bottom wall 25c has a basically concave shape.

Figure 12:
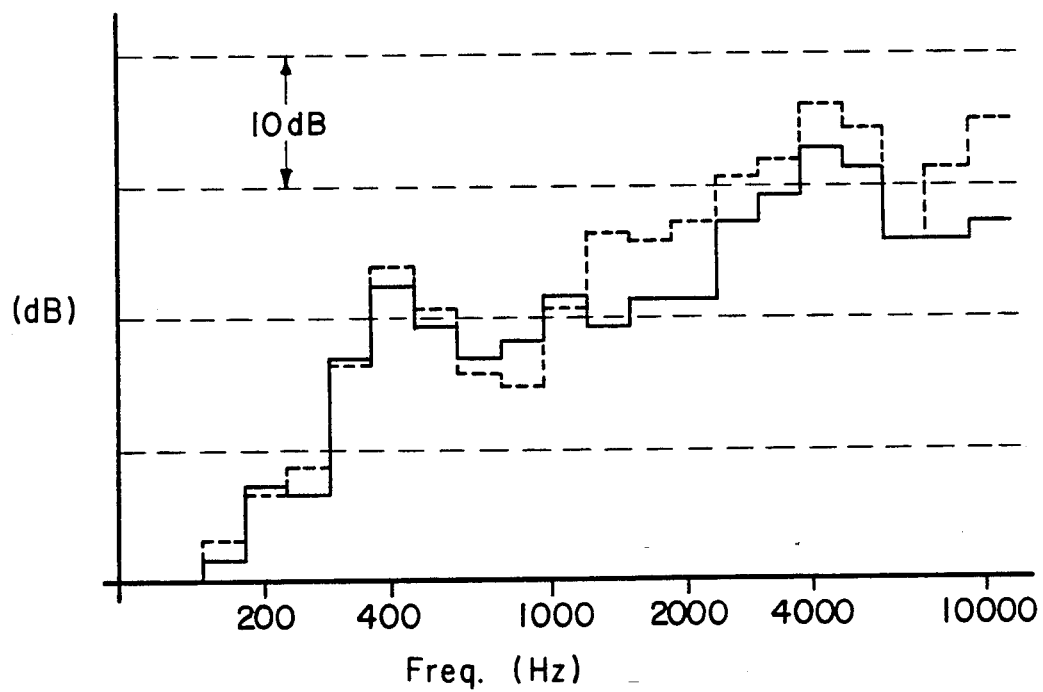
FIG. 12 is a graph showing the acoustic spectrum of compressor noise herein discussed with the housing recess being made up according to the prior art and this invention.

The graph of FIG. 12 shows a substantial reduction in the noise level to be expected specially at high frequencies, for the construction of the present invention in relation to that for the prior art.

I claim:

1. An outlet valve for a rotary rolling piston compressor, comprising:

a cylinder of metal formed by a cylinder block and two opposed end walls,

A piston moving within said cylinder and defining a suction chamber and a compression chamber, the outer face of one of the end walls having an oblong recess formed therein, said one end wall also having a gas discharge passage extending therethrough in the area of said oblong recess communicating with one of said chambers, an annular valve seat at the outlet end of said gas passage extending upwardly from the bottom wall of the recess, the upper end of said seat being below the outer face of said one end wall, a blade outlet valve located in said oblong recess for sealing the gas passage outlet by resting on said seat, said seat having a continuous rounded surface starting from its interior at point before contact by the blade valve and on which the blade valve rests, and the junction of the recess bottom wall and the recess side wall circumscribing the valve seat having a concave curvature, the shape of the seat and junction serving to guide the gas around the junction and along the recess side wall.

2. An outlet valve according to claim 1, wherein the bottom wall of the oblong recess circumscribing the valve seat is of rounded concave shape extending toward the recess side wall.

3. An outlet valve according to claim 1, wherein the side wall of the oblong recess circumscribing the valve seat has a radial spacing to the peripheral edge of the valve seat on which the blade rests of not less than about ¾ of the diameter of the valve seat as measured at said peripheral edge.

4. An outlet valve according to claim 3, wherein the radial spacing increases from the opposed side areas of the valve seat towards the side wall area of the oblong recess provided along the blade longitudinal axis.

5. An outlet valve according to claim 4, wherein said radial spacing increases along with a substantially elliptical contour.

6. An outlet valve as in claim 1, wherein the outer surface of the valve seat extending above the recess bottom wall is also curved.

7. An outlet valve as in claim 1, wherein the inner surface of the upper end of the valve seat is flared outwardly and the outer surface of the seat is also convex curved.

8. An outlet valve according to claim 1, wherein the rolling piston is assembled on a crankshaft which is supported by main and secondary bearings, the oblong recess and valve being provided on a face of one of said bearings.

9. An outlet valve according to claim 2, wherein the side wall of the oblong recess circumscribing the valve seat has a radial spacing to the peripheral edge of the valve seat on which the blade rests of not less than about $\frac{3}{4}$ of the diameter of the valve seat as measured at said peripheral edge.

* * * * *